Jan. 24, 1939.   D. E. HOWARD   2,145,116
OPTICAL APPARATUS FOR INDICATING THE POSITION OF A TOOL
Filed June 29, 1937
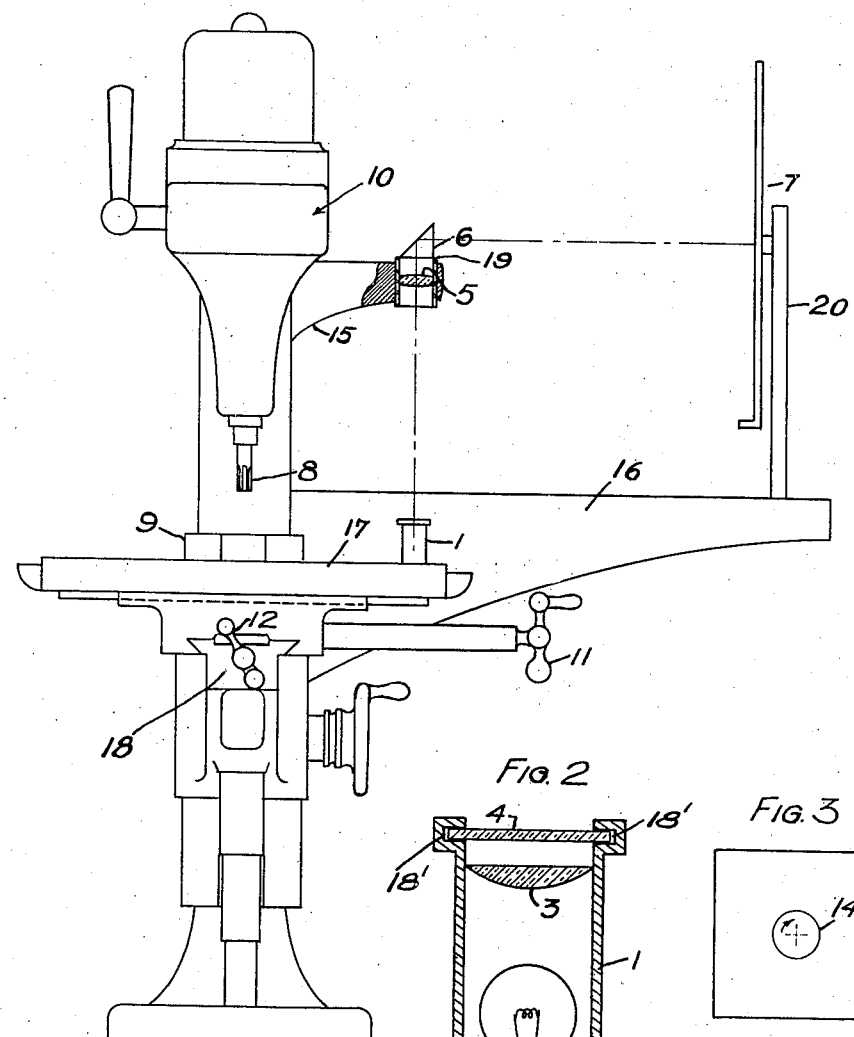
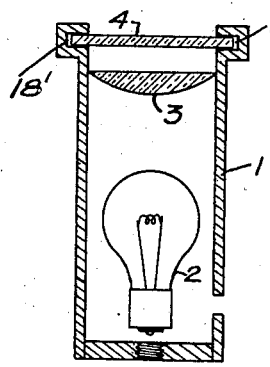
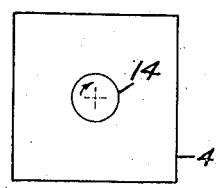
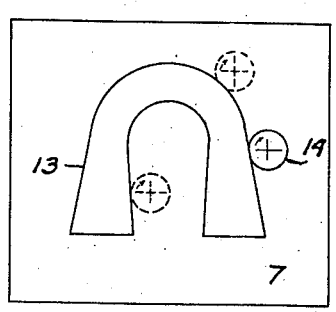
Inventor
Darnley E. Howard
By Kimmel & Crowell
Attorneys Patented Jan. 24, 1939

2,145,116

UNITED STATES PATENT OFFICE 2,145,116

OPTICAL APPARATUS FOR INDICATING THE POSITION OF A TOOL

Darnley E. Howard, Washington, D. C.

Application June 29, 1937, Serial No. 151,008

2 Claims. (Cl. 88—24)

This invention relates to a method of and apparatus for indicating to an operator the position of a tool with respect to the work being acted upon thereby.

The invention aims to provide an optical method and apparatus for following the outline of the simulation of a completed article through the medium of an image projected upon such simulation for the purpose of visibly indicating to an operator the position of a tool with respect to a piece of work being acted upon to have an outline corresponding to the outline of the simulation and whether any change is to be made in the position of the tool relative to the work during the operation of the tool.

At the present time if it is desired to make a plate cam, for example a drawing is made giving the size, angles and curves desired for the cam, which is necessary to make the outline required. The machinist then transfers these dimensions to his work, a difficult process at best. The work is then acted upon by suitable means and the outline is roughed out. The outline may be more accurately finished by a suitable milling means and if the outline lends itself to machining in straight lines and circles, it may be quite accurately machined out by the modern universal die making machines. If the work requires a flange to fasten it on as a thin punch would, sawing is impossible and the work must be milled out. If the outline is irregular, i. e., other than straight lines and circles or even interrupted circles, then the work can only be finished by difficult and tedious hand methods. To overcome the foregoing objections and to expeditiously and accurately complete the work acted upon is the aim of this invention and to this end the invention consists in providing an accurate scale drawing of the outline desired and utilizing such outline in connection with a projected image of the tool operating on the work as a guide to the operator to facilitate the accurate completion of the work.

To the above ends essentially and to others which may hereinafter appear, the invention consists of a method and an apparatus for the purpose set forth which falls within the scope of the invention as claimed.

In the drawing:

Figure 1 is a front elevation of a milling machine equipped with the necessary elements for carrying out the method in accordance with this invention, Figure 2 is a vertical sectional view of a combined carrier and housing for a simulation carrying slide and an illuminating means for the latter, Figure 3 is a top plan view of a simulation carrying slide, and Figure 4 is a front elevation of a screen provided with a drawing setting forth the outline of the work when the latter is completed.

With reference to the drawing, 10 indicates a milling machine having an upper slide 17 and a lower slide 18 which carries the slide 17. The slides 17 and 18 have associated therewith selectively adjusting means 11 and 12 respectively therefor. The machine includes a driven tool 8 which is vertically adjustable. The machine 10 is of known construction and to be provided with superposed laterally extending brackets 15 and 16. The bracket 16 is of greater length than bracket 15. As is well known the slide 17 in some instances is termed a platform and is laterally and horizontally adjustable. The work 9 to be acted upon is mounted on and bodily moves with the slide 17 when the latter is adjusted.

The apparatus, by way of example, includes an open top housing 1 formed with a pair of spaced parallel oppositely disposed grooves 18' at its open top. Within the housing 1 is a light source, such as a lamp 2 for connection with an electrical source, not shown. A lens system 3 is arranged within the housing 1 in proximity to the open top of the latter and above the lamp 2. A light emitting slide or illuminable member 4 is removably mounted in the grooves 18' and is provided with light emitting portions to provide an image 14. The latter is in the form of a simulation of the cross sectional outline of the tool 8.

The apparatus includes a combined reflecting and projecting means of the optical type which, by way of example, is shown as consisting of a lens 5 and a prism 6 mounted in a sleeve 19. The lens 5 is arranged below the prism. A screen 7 having attached to one of its faces a drawing 13 of the outline of what would be the work when completed. The screen 7 is suspended from the support 20.

The slide 4 is typical and may be made in a number of different ways, but the easiest is photographically. A circle which has its extreme outside dimensions exactly equal to the diameter of the tool is formed on the slide by photography and this provides the image 14. The slide may, if desired, be provided with spaced images of different diameters, but each diameter of an image must correspond to the cross sectional contour of a tool.

The lens 5 is accurately ground and corrected for various optical errors and is adjustable in the sleeve 19 to permit of focusing. The reflecting means is bodily movable vertically with the tool head and is stationary with respect to the slide 17.

The screen 7 which carries the drawing 13 may be vertically, horizontally and angularly adjusted.

The lens 5 is for collecting the light from the lamp 2.

The drawing 13 on the screen 7 is to be an accurate scale drawing of the desired outline of and magnified with respect to what would be the size of the completed work.

The housing 1 is mounted on the slide 17 and suitably secured to the latter so that it will bodily move therewith. The sleeve 19 is mounted in the bracket 15 and is arranged in superposed aligned relation with the illuminating means 2. The support 20 for the screen 7 is illustrated as being carried by the bracket 16. The screen is disposed in lateral spaced relation with respect to the reflecting means. The preferred arrangement of the elements of the apparatus is as shown in Figure 1, which is disposing the combined reflecting and projecting means in fixed relation with respect to the tool, disposing the screen with the drawing thereon in fixed relation with respect to the tool and in fixed optical relation with respect to said means, and disposing the slide or member 4 in fixed relation with respect to the work carrying means, but it is to be understood that the elements may be arranged in any suitable manner for obtaining the object of the invention.

When lamp 2 is illuminated the lens 5 takes image 14 on slide 4 and the prism 6 directs the beam gathered by lens 5 on the drawing 13 on the screen 7. The size of the drawing 13 on the screen 7 is dependent upon the distance from the lens 5 to the drawing 13 (the relationship of the conjugate foci). Any degree of magnification of the image 14 on the slide 4 may be obtained by increasing the ratio of the distance from lens 5 to screen 7 and to the distance from lens 5 to slide 4. In the same manner any movement of the housing 1, due to the slide 17, is magnified in the same ratio on the screen as the image 14 was enlarged. Therefore, if the outline is drawn five times the desired size, the ratio of distances between lens 5 and slide 4 and from lens 5 to screen 7 is made five to one. Then the projected image of the tool will be five times the size of the actual tool and on any movement of the slide 17 will be amplified five times on the screen 7. The operator need only follow the relation of the magnified outline 13 to the magnified image 14 of the tool to assist him in positioning the tool at the proper point with respect to the work 9 whereby the latter will be cut to the outline desired and to the actual size required.

The drawing 13 is typical and is shown by way of example as a horse-shoe outline drawn to an enlarged scale. On this drawing is projected the equally similarly enlarged tool outline 14 when acting upon the work. The tool outline is made to progressively move around the outline of the drawing keeping the edges only in contact to mill out the required shape of the work 9. The advantages when employing the method and apparatus in accordance with this invention are as follows:

It is purely an optical means, no mechanical or moving parts being required as in a pantograph.

The accuracy of the work is dependent only on the carefulness of the operator, the accuracy of the drawing 13 and the quality of the lens 5.

The drawing 13 may be made on white paper with ink giving maximum visibility which is superior to any possible layout on steel.

The same drawing may be used indefinitely not being destroyed as the layout on the work is at present, thus enabling any number of duplicates from the same drawing.

By using a magnified drawing unavoidable errors in following the outline are reduced in proportion to the magnification.

The outline may be followed easily with the naked eye as compared to the laborious method sometimes practiced by using a microscope in which the operator takes a cramped position and strains his eyes.

With a lens of aperture $f3.5$ or larger, the projected outline may be followed in normally lighted shops, no dark room being necessary.

The method of using a projected cross section of the tool eliminates modifying the drawing to allow for the size of the tool.

As the tool is changed to take care of smaller or larger fillets or radii, a simple change of slide 4 to correspond with the tool used maintains all relationships constant.

The projected optical image in no way interferes with a constant and complete view of the whole outline, as a physical pointer would obscure a part of the drawing, casts shadows and sometimes conceals the outline being followed.

The outline of the tool may be placed on the slides very easily by merely photographing black circles; slides of various tool sizes can then be cheaply obtained. Slides may also be printed with the size of the tool, direction of rotation and cross lines at the center of the cutter. The thickness of the outline even giving an indication as to the depth of cut.

The outline of the drawing may be gone over any number of times to take care of run-out of cutter and to improve the finish on the work.

After hardening the work a grinding wheel may be substituted for the cutter and followed precisely as before.

If the machine is of the shaper type the outline of its cutter may be used. In this way sharp corners may be worked out.

A small proportional increase or decrease of the size of a die and its corresponding punch may be obtained by merely moving the screen, thus slightly changing the ratio.

This device is easily attached to the present sturdy machines and requires no specially designed machine as does the engraving type.

The device illustrated contemplates feeding the vertical head into the work. If this invention is placed on the head to indicate its movement as it is now placed on the table three dimensional objects may be made using two drawings. One a plan view, the other contours or sections.

The job of "laying out" is transferred from the shop to the drafting office where it is more easily accomplished.

If a center drill be substituted for the tool 8 and a cross hair in the center of the slide 4 be used as indicating means, holes may be spotted and bored from corresponding points on the drawing. This means that the device makes a vertical miller into a jig borer with the definite advantages that any change of the cutter after the cut is started is easily noted.

If the magnified drawing is so large and the distances from prism 6 to screen 7 so great that the operator has difficulty in seeing, he may sit closer to the drawing and operate the machine by remote control. It is not necessary to look at the work.

The work may be flooded with oil, burs can be raised but the operator need not worry, because his drawn outline remains clean, clear and completely visible.

By placing a scribing point in place of tool 8, an outline may be accurately and easily traced on the work from the drawing.

What I claim is:

1. An indicating apparatus for use in connection with a milling machine of that type having a tool holder, a horizontally disposed slidably mounted adjustable work carrier, a tool mounted in the holder for acting on the work upon the carrier, a mounting for the carrier and a supporting structure common to the holder and mounting, said apparatus including an optical reflecting and deflecting means supported by the tool holder disposed in fixed relation to the tool, a projection screen mounted on said supporting structure in fixed optical relation to the tool holder and provided with a drawing in outline simulating the appearance of the completed work, and an illuminable member supported by the work carrier in fixed relation to the work and disposed in optical alignment with said reflecting and projecting means, said member being bodily movable with the work holder and provided with an illuminable area projected by said reflecting and projecting means on said screen in relation to and to follow said drawing for indicating the position of the tool relative to the work.

2. In an indicating apparatus for use in connection with a milling machine having a tool holder, a horizontally disposed work carrier, a tool carried by the holder for acting upon the work upon the carrier and a supporting structure common to said holder and carrier, said apparatus including an optical reflecting and deflecting means supported by the tool holder disposed in fixed relation to the tool, a projection screen mounted on said supporting structure in fixed optical relation to the tool holder and provided with a drawing simulating the appearance of the completed work, an illuminable member supported by the work carrier in fixed relation to the work and disposed in optical alignment with the reflecting and projecting means, said member being provided with an illuminable area for projection by the reflecting and projecting means on said screen, and means on said supporting structure to provide for the tool and carrier moving relatively to each other to cause the illuminable area to follow the drawing on the screen to indicate the position of the tool relative to the work.

DARNLEY E. HOWARD.